Aug. 2, 1949.  C. M. HATHAWAY  2,477,801
AIR PRESSURE SWITCH
Filed May 19, 1945
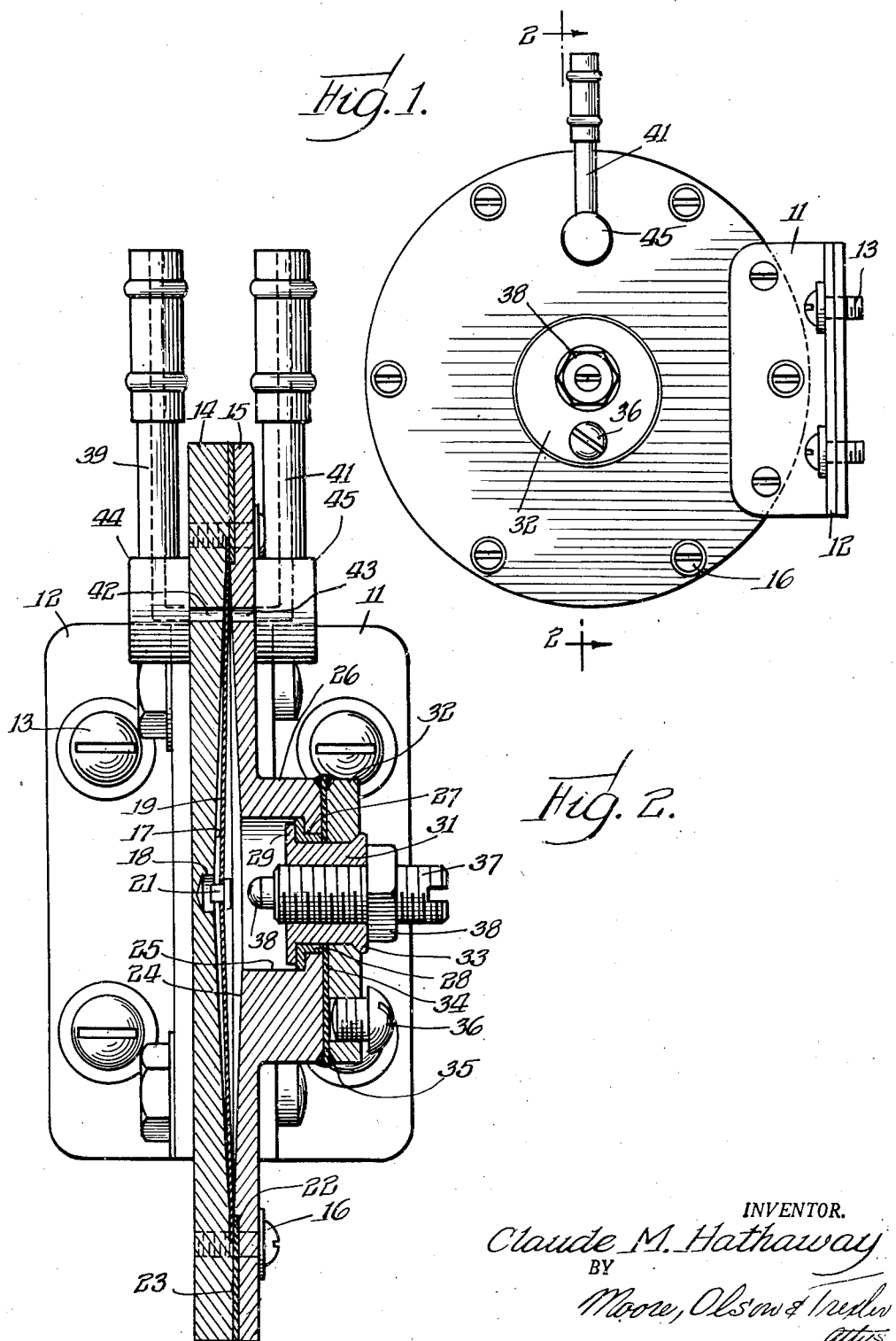
INVENTOR.
Claude M. Hathaway
BY
Moore, Olson & Trexler
attys.

Patented Aug. 2, 1949

2,477,801

UNITED STATES PATENT OFFICE 2,477,801

AIR PRESSURE SWITCH

Claude M. Hathaway, Denver, Colo.

Application May 19, 1945, Serial No. 594,725

3 Claims. (Cl. 200—83)

The present invention relates to an air pressure switch, and more particularly to such switch suited for obtaining a record of air speed in aircraft above or below a predetermined minimum speed.

In the operation of aircraft it is desired to obtain a record of the speed of the aircraft to indicate when the air speed is equal to or greater than a certain speed such as for example sixty miles per hour. Although the air speed may exceed this critical speed of sixty miles per hour by a value of ten times as much, the instrument responsive to the air speed must again become operative when the air speed falls below this minimum speed.

The apparatus must not be damaged or changed in calibration by this change of operation. To provide an electrical switch which will operate reliably at a relative low pressure for example at three-fourths inches of water but which will not be damaged or changed in calibration by a pressure of over one hundred times this amount involves a number of difficulties.

In accordance with the present invention this difficult problem is solved by the use of a diaphragm switch which is arranged to be responsive to the low pressure and which is so constructed as to resist damage and change in calibration at relatively high pressures.

It, therefore, is an object of the present invention to provide a pressure responsive switch which will close at a predetermined relatively low pressure and which will open when the pressure falls below this amount and yet withstand relatively high pressure.

A further object of the present invention is to provide a snap action switch responsive to relatively low pressure which is capable of withstanding relatively high pressure.

Other and further objects of the present invention will become apparent by reference to the following description taken in conjunction with the accompanying drawing wherein Figure 1 is a side view of a pressure switch constructed in accordance with the present invention; and Figure 2 is a cross sectional view of the switch shown in Figure 1 as seen in the direction of the arrows along the line 2—2.

Referring more particularly to the drawing there is shown a pressure switch particularly adapted for use in conjunction with recording apparatus commonly referred to as a flight analyzer for aircraft.

This switch is supported on the aircraft by a pair of brackets 11 and 12 by suitable fastening means such as screws or bolts 13. Between the brackets 11 and 12 there is positioned a casing formed of two portions 14 and 15 secured together adjacent the periphery by a plurality of screws 16. The casing portion 14 has a generally conical recess 17 which at its lowermost point is provided with a small general cylindrical recess 18. The conical recess 17 is arranged to support a diaphragm 19 whenever the pressure within the apparatus drops below a predetermined amount. The recess 18 accommodates a contact 21 mounted at the center of the diaphragm 19.

The diaphragm 19 is formed of a sheet of metal, preferably Phosphor bronze which is spun so as to stretch the center of the diaphragm and to give a slight conical inclination thereto. This stretching of the diaphragm produces a snap action effect which causes the diaphragm to be deflected rapidly from one position to the other. The diaphragm 19 is mounted between the two casing portions 14 and 15. The casing 15 adjacent its periphery is provided with an annular recess 22 in which is mounted a sealing gasket 23 which gasket engages the outer periphery of the diaphragm 19.

The other casing portion 15 is also provided with a conical recess 24 which is joined at its center by a cylindrical recess 25. The cylindrical recess extends into a boss portion 26 which has a central aperture 27. The central aperture 27 contains an assembly of parts for providing an insulated electrical connection. Within the recess 26 and the aperture 27, there is positioned an insulating collar 28 which is engaged by the shoulders 29 of a sleeve member 31. The sleeve member 31 preferably is formed of brass or other material which is capable of being worked by a spinning operation. The sleeve 31 extends through an aperture in a closure plate 32 which is provided with a conical edge so that the sleeve 31 may be spun or rolled to form a flange 33.

The plate 32 is electrically insulated from the casing by an insulation plate 34, which may be sealed on either side by a suitable fillet 35 of a plastic gasket material. An electrical connection is made to the plate 32 by a suitable contact screw 36.

The sleeve 31 is provided with an internal thread which engages the external thread on a stud 37 which carries at its inner end an electrical contact 38. The stud 37 is locked in the desired adjusted position by a lock nut 38. The contact 38 therefore is positioned so that when the diaphragm 19 is deflected toward this contact, the contact 21 carried by the diaphram makes a proper electrical contact with the contact 38. The electrical circuit is completed by connecting a terminal to one of the fastening screws 13.

Adjacent the upper end of the casing a plurality of air passages or pipes 39 and 41 are provided. The passage or pipe 39 is connected to the conical recess 17 of the left hand portion 14 of the casing by a passage 42. The air passage 39 constitutes the incoming air passage or in other words the passage which normally will have the greater amount of pressure. The passage 41 is connected through a passage 43 to the conical recess 24 of the other half of the casing 15. The passages 42 and 43 are formed in bosses 44 and 45 which are integrally formed with the casing portions 14 and 15 in any suitable manner including fabrication by which the bosses 44 and 45 are welded in position prior to the time that the passages 42 and 43 are formed.

In operation the passages 41 and 39 are connected by suitable flexible conduits to the Pitot tube positioned at the exterior of the aircraft. As soon as the air pressure supplied to the cavity 17 exceeds a predetermined amount as for example a pressure equivalent to one and three-fourths inches of water, the diaphragm 19 will snap over against the conical surface 24 of the other half of the housing 15. When this occurs the contact 21 engages the electrical contact 38 thereby completing an electrical circuit. Since the diaphragm 19 is supported over the greater portion of its area by the conical surface 24 of the housing portion 15, the diaphragm is capable of withstanding all normally encountered excess pressures which may be one hundred times or more greater than the pressure at which the diaphragm 19 is to operate.

As soon as the air pressure again drops to this predetermined value of one and three-fourths inches of water, the diaphragm 19 is ready to respond to a slight decrease thereby to snap back to its original position. In the event that the differential pressure supplied by the tubes 39 and 41 is such that the pressure on the right side of the diaphragm is slightly greater than under normal operation, the conical surface 17 will support the diaphragm 19 to prevent any damage thereof.

While for the purpose of illustrating and describing the present invention, a certain embodiment has been shown in the drawing, it is to be understood that such variations are contemplated as may be commensurate with the spirit and scope of the invention as defined in the following claims.

This invention is hereby claimed as follows:

1. A fluid pressure responsive electric switch arranged to respond to a relatively low pressure and yet withstand relatively high pressure comprising a housing of cylindrical shape having a small height compared to the diameter, said cylindrical shaped portion containing a pressure responsive diaphragm having a slightly dished configuration so as to be deflected by a snap action from one position to another at a predetermined relatively low pressure, an electric contact supported by said diaphragm, an insulated contact supported by a portion of said housing, means for making electrical connections to said contacts, and relatively low altitude conical recess means formed in said housing for supporting substantially the greater portion of the surface of said diaphragm whereby relatively high pressures will not affect the calibration of the diaphragm.

2. A fluid pressure responsive electric switch arranged to be subjected to a wide range of pressures comprising a housing having at least two portions, a thin Phosphor bronze pressure responsive diaphragm supported at the periphery by said housing portions, said diaphragm having a slightly dished configuration so as to be deflected by a snap action from one position to another at a predetermined relatively low pressure, an electric contact mounted at the center of said diaphragm, an insulated electric contact adjustably supported by one portion of said housing for cooperation with the electric contact on said diaphragm, means for making electrical connections to said contacts, and a relatively low altitude conical recess formed in each portion of said housing for supporting substantially the greater portion of the surface of said diaphragm upon the excessive deviation of pressure from a predetermined value of pressure.

3. An electric switch subject to fluid pressures ranging from one inch to several hundred inches of water comprising a housing of cylindrical shape having a height which is small compared to the diameter, said housing having at least two portions, a relatively thin spun metal pressure responsive diaphragm of slightly conical shape for deflection by snap action by a change of pressure passing through a predetermined value of relatively low pressure, an electrical contact supported at the center of said diaphragm, an insulated electric contact supported by said housing for cooperation with said first contact, the portion of said housing supporting said latter contact having a frusto-conical inner surface for supporting the major portion of one surface of said diaphragm whenever the fluid pressure exceeds said predetermined low pressure value, the other portion of said housing having a frusto-conical inner surface for supporting the major portion of the other surface of said diaphragm whenever the fluid pressure drops appreciably below said first mentioned value of pressure.

CLAUDE M. HATHAWAY.

REFERENCES CITED

The following references are of record in the file of this patent:

UNITED STATES PATENTS

| Number | Name | Date |
| --- | --- | --- |
| 708,155 | Meloon | Sept. 2, 1902 |
| 1,684,530 | Bast | Sept. 18, 1928 |
| 1,782,838 | Brillie | Nov. 25, 1930 |
| 1,829,807 | McMurrin | Nov. 3, 1931 |
| 2,086,264 | Gorschalki | July 6, 1937 |
| 2,103,214 | Coffin | Dec. 21, 1937 |
| 2,111,168 | Chansor | Mar. 15, 1938 |
| 2,229,740 | Helmore | Jan. 28, 1941 |